United States Patent [19]

Matsubayashi

[11] Patent Number: 5,605,752
[45] Date of Patent: Feb. 25, 1997

[54] MAGNETIC RECORDING MEDIUM CONTAINING MAGNETIC POWDER OF IRON NITRIDE

[75] Inventor: Yoshiteru Matsubayashi, Mito, Japan

[73] Assignee: Victor Company of Japan, Ltd., Yokohama, Japan

[21] Appl. No.: 534,331

[22] Filed: Sep. 27, 1995

[30] Foreign Application Priority Data

Sep. 28, 1994 [JP] Japan .................................. 6-259132
Dec. 28, 1994 [JP] Japan .................................. 6-339728

[51] Int. Cl.$^6$ .................................................. G11B 5/706
[52] U.S. Cl. ...................... 428/323; 428/328; 428/332; 428/425.9; 428/480; 428/520; 428/694 BA; 428/694 BG; 428/694 BU; 428/698; 428/900
[58] Field of Search ...................... 428/323, 328, 428/332, 425.9, 480, 520, 694 BA, 694 BG, 694 BU, 698, 900

[56] References Cited

U.S. PATENT DOCUMENTS 5,387,464  2/1995  Kato et al. ........................... 428/328
5,407,725  4/1995  Ryoke et al. ........................ 428/141
5,439,754  8/1995  Iwasaki et al. ...................... 428/692

*Primary Examiner*—Stevan A. Resan
*Attorney, Agent, or Firm*—Michael N. Meller

[57] ABSTRACT

A magnetic recording medium comprises a support film and a magnetic layer formed by painting the support film with magnetic material together with a binder. The magnetic powder is iron nitride material and has saturation magnetization $\sigma_s$ of 160–210 emu/g, coersive force Hc of 1500–2500 Oe, acicular ratio of 5–15 and major axis length of 0.05–0.15 μm and the binder contains at least one of vinyl chloride copolymer, polyvinyl chloride acetate copolymer, polyester resin and uretane resin and at least one functional group selected from a group consisting of amino group, methylol group, carboxyl group, acid amide group, isocyanate group, sulfonic acid metallic salt group, phosphate group, quaternary ammonium salt group, sulfo betaine group and epoxy group.

1 Claim, 1 Drawing Sheet

MAGNETIC RECORDING MEDIUM CONTAINING MAGNETIC POWDER OF IRON NITRIDE

BACKGROUND OF THE INVENTION

1. Field of the Invention

The present invention relates to a painting type magnetic recording medium including a magnetic layer containing magnetic powder of iron nitride material and, particularly, to a magnetic recording medium realizing a high electromagnetic conversion characteristics and reliability.

2. Description of the Related Art

In order to realize a high recording density of a magnetic recording medium, an improvement of a magnetic characteristics of a magnetic layer of the magnetic recording medium, which is provided by painting of magnetic material on a base material of the magnetic recording medium, has been tried. In order to improve the magnetic characteristics of the painted magnetic layer, it has been known to use magnetic material having high magnetic characteristics as magnetic powder constituting the painted magnetic layer.

Since magnetic attractive force of particles of the powder having high magnetic characteristics, particularly, large saturation magnetization, is large and magnetic particles are attracted to each other, it is difficult to uniformly disperse the magnetic powder during a preparing step of a magnetic paint (powder dispersion step). The higher the dispersion of magnetic particles in the magnetic paint results in the higher the magnetic characteristics of a resultant magnetic recording medium, the higher the reproduced output and the lower the noise level of the output. Further, since the adsorbance of resin on magnetic particle surface is improved by improving the dispersion of the magnetic powder, a mechanical strength of the magnetic paint layer increases and the reliability is improved. Although it is confirmed that the improvement of the dispersion of magnetic powder having high magnetic characteristics improves both the electromagnetic conversion characteristics and the reliability of the final magnetic recording medium, there is no magnetic recording medium satisfying the required dispersion of magnetic powder as yet.

SUMMERY OF THE INVENTION

An object of the present invention is to provide a magnetic recording medium whose electromagnetic conversion characteristics is high, which can be stocked without degradation of quality, which has a magnetic layer provided by painting of stable magnetic layer, which has a surface being high quality and which has high mechanical strength.

A magnetic recording medium according to the present invention whose electromagnetic conversion characteristics is high, which can be stocked without degradation of quality, which has a magnetic layer provided by painting of stable magnetic paint, which has a surface being high quality and which has high mechanical strength, comprises a magnetic layer formed by painting a support film with magnetic material, the magnetic layer containing magnetic powder and a binder, mainly, wherein the magnetic powder is represented by Fe αNβMγM*δ where α, β, γ and δ satisfy the following relation:

$$0.05 \leq \frac{\beta}{\alpha+\beta} \leq 0.15, 0 < \frac{\gamma+\delta}{\alpha+\beta} \leq 0.3$$

and M and M* each is selected from a group consisting of Be, Mg, Ca, Sr, Ba, Ra, Sc, Y, La, Ce, Pt, Nd, Sm, Eu, Gd, Tb, Dy, Ho, Er, Tm, Yb, Lu, Ti, Zr, Hf, V, Nb, Ta, Cr, Mo, W, Mn, Re, Ru, Os, Co, Rh, Ni, Pd, Cu, Zn, B, Al, Ga, In, Tl, Si, Ge, Sn, Pb, P, As, Sb, Bi, Se, Te and has saturation magnetization $\sigma_s$ of 160–210 emu/g, coersive force Hc of 1500–2500 Oe, acicular ratio of 5–15 and major axis length of 0.05–0.15 μm and wherein the binder contains at least one of vinyl chloride copolymer, polyvinyl chloride acetate copolymer, polyester resin and uretane resin and at least one functional group selected from a group consisting of amino group, methylol group, carboxyl group, acid amide group, isocyanate group, sulfonic acid metallic salt group, phosphate group, quaternary ammonium salt group, sulfo betaine group and epoxy group.

DETAILED DESCRIPTION OF THE PREFERRED EMBODIMENTS

Figure 1:
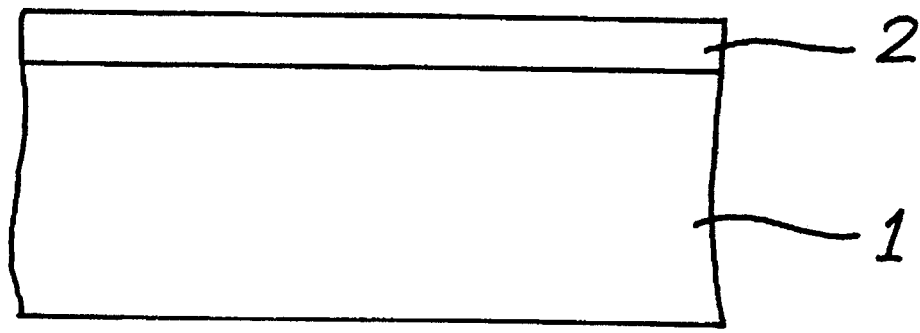
FIG. 1 is a cross section showing a construction of a magnetic recording medium according to the present invention.

An embodiment of a magnetic recording medium according to the present invention will be described in detail with reference to FIG. 1 which is a cross section showing a construction of the magnetic recording medium according to the present invention. In FIG. 1, a reference numeral 10 depicts the magnetic recording medium, 1 a support film and 2 a magnetic layer.

Magnetic powder contained in the magnetic layer 2 of the present magnetic recording medium 10, which is formed by painting the support film 1 with magnetic paint is of iron nitride magnetic powder represented by:

Fe αNβMγM*δ where α, β, γ and δ satisfy the following relation:

$$0.05 \leq \frac{\beta}{\alpha+\beta} \leq 0.15, 0 < \frac{\gamma+\delta}{\alpha+\beta} \leq 0.3$$

and M and M* each is selected from a group consisting of Be, Mg, Ca, St, Ba, Ra, Sc, Y, La, Ce, Pt, Nd, Sm, Eu, Gd, Tb, Dy, Ho, Er, Tm, Yb, Lu, Ti, Zr, Hf, V, Nb, Ta, Cr, Mo, W, Mn, Re, Ru, Os, Co, Rh, Ni, Pd, Cu, Zn, B, Al, Ga, In, Tl, Si, Ge, Sn, Pb, P, As, Sb, Bi, Se, Te.

A binder for the magnetic powder contained in the magnetic layer 2 is of at least one of vinyl chloride copolymer, polyvinyl chloride acetate copolymer, polyester resin and uretane resin and at least one functional group selected from a group consisting of amino group, methylol group, carboxyl group, acid amide group, isocyanate group, sulfonic acid metallic salt group, phosphate group, quaternary ammonium salt group, sulfo betaine group and epoxy group. With the magnetic powder and the binder mentioned above, the magnetic recording medium 10 provides high electromagnetic conversion characteristics and high reliability.

In order to realize hight electromagnetic conversion characteristics of the magnetic recording medium 10, it is preferable to use fine magnetic particles having high magnetic characteristics as the magnetic powder constituting the magnetic layer 2 and to disperse the magnetic powder in the magnetic paint uniformly. Further, by dispersing the magnetic powder in the magnetic paint, resin as the binder is adsorbed on surface of the magnetic particles, so that the mechanical strength of the magnetic recording medium 10 is improved and the reliability thereof is also improved.

The magnetic powder of iron nitride mentioned above exhibits higher saturation magnetization compared with metal magnetic powder heretofore used and is effective in realizing high magnetic characteristics.

The constitution of the magnetic powder is represented by:

Fe αNβMγM*δ where α, β, γ and δ satisfy the following relation:

$$0.05 \leq \frac{\beta}{\alpha+\beta} \leq 0.15, 0 < \frac{\gamma+\delta}{\alpha+\beta} \leq 0.3$$

and M and M* each is selected from a group consisting of Be, Mg, Ca, Sr, Ba, Ra, Sc, Y, La, Ce, Pr, Nd, Sm, Eu, Gd, Tb, Dy, Ho, Er, Tm, Yb, Lu, Ti, Zr, Hf, V, Nb, Ta, Cr, Mo, W, Mn, Re, Ru, Os, Co, Rh, Ni, Pd, Cu, Zn, B, Al, Ga, In, Tl, Si, Ge, Sn, Pb, P, As, Sb, Bi, Se, Te.

It has been found that, when saturation magnetization of the magnetic powder is 160 emu/g or smaller, saturation magnetic flux density Bm of the magnetic layer 2 of the magnetic recording medium 10, which is prepared from the magnetic powder, is not sufficient and satisfactory electromagnetic conversion characteristics is not obtained. Further, it has been found that, when chemical stability of the magnetic powder is to be realized, it is impossible to provide magnetic powder having saturation magnetization σs of 210 emu/g or more.

Further, it has been found that, when the acicular ratio of the magnetic powder is smaller than 5, the magnetic powder is not oriented enough in the orientation processing in magnetic field to obtain the magnetic layer 2 exhibiting good square hysteresis curve and having good electromagnetic conversion characteristics and, when the acicular ratio exceeds 15, the magnetic characteristics and the electromagnetic conversion characteristics of the magnetic recording medium 10 are degraded. These facts may be due to that dispersion of the magnetic powder in these states is difficult and the magnetic powder is destroyed during the dispersion step.

It has been found that, when the length of major axis of the magnetic powder is smaller than 0.05 microns, it is difficult to obtain good magnetic characteristics of the magnetic powder and to disperse it uniformly, resulting in low magnetic characteristics of the magnetic layer 2 of the magnetic recording medium 10, and, when the length exceeds 0.15 microns, a reproduced output and C/N ratio are low when a signal having short wavelength is recorded and reproduced.

Further, it has been found that, when coercive force Hc of the magnetic powder is 1500 Oe or smaller, the reproduced output for short wavelength signal is low and, when it exceeds 2500 Oe, a reproduced output for long wavelength signal is low and erase rate is degraded.

In preparing the magnetic layer 2 of the magnetic recording medium 10, which has high electromagnetic conversion characteristics and high reliability, with using a magnetic paint of the above mentioned magnetic powder, the binder for the magnetic powder contained in the magnetic layer 2 is of at least one of vinyl chloride copolymer, polyvinyl chloride acetate copolymer, polyester resin and uretane resin and at least one of amino group, methylol group, carboxyl group, acid amide group, isocyanate group, sulfonic acid metallic salt group, phosphate group, quaternary ammonium salt group, sulfo betaine group and epoxy group.

Physical characteristics of the binder in the magnetic layer 2 influences physical characteristics of the magnetic recording medium 10 itself. However, the kind of resin and molecular weight thereof are to be selected suitably in view of condition of use of the magnetic recording medium.

Concentration of functional group and/or groups to be used in the binder depends upon conditions of manufacturing steps, of the use of the magnetic recording medium and of chemical characteristics of other additives of the magnetic layer 2 thereof.

Embodiments of the present invention will be described in detail.

The magnetic paint was prepared by using the following constituents:

| | |
|---|---|
| magnetic powder | 100 weight parts |
| resin 1 | A weight parts |
| resin 2 | B weight parts |
| resin 3 | C weight parts |
| resin 4 | D weight parts |
| α-alumina | 2 weight parts |
| carbon black | 2 weight parts |
| palmitic acid | 2 weight parts |
| isocyanate | 3 weight parts |
| cyclohexanone | 100 weight parts |
| methyl ethyl ketone | 100 weight parts |

The above materials were mixed and dispersed by a sand mill. Table 1 shows magnetic powders used in this embodiment.

TABLE 1

| magnetic powder | material | saturation magnetization (emu/g) | coercive force Hc (Oe) | major axis length (micron) | acicular ratio |
|---|---|---|---|---|---|
| A | iron nitride | 181 | 1780 | 0.09 | 11 |
| B | metal powder | 133 | 1750 | 0.10 | 13 |
| C | iron nitride | 184 | 2430 | 0.12 | 12 |

Table 2 shows resins used in the embodiment.

TABLE 2

Resins Used

| resin | material | molecular weight | functional group | concentration of functional group |
|---|---|---|---|---|
| a | vinyl chloride copolymer | 30,000 | amino group $-NH_2$ | 1/15,000 |
| b | vinyl chloride copolymer | 30,000 | methylol group $-CH_2OH$ | 1/15,000 |
| c | vinyl chloride copolymer | 30,000 | carboxyl group $-CO_2H$ | 1/15,000 |
| d | vinyl chloride copolymer | 30,000 | acid amide group $-CONH$ | 1/15,000 |
| e | vinyl chloride | 30,000 | isocyanate group | 1/15,000 |

TABLE 2-continued

Resins Used

| resin | material | molecular weight | functional group | concentration of functional group |
|---|---|---|---|---|
| f | vinyl chloride copolymer | 30,000 | —NCO sulfonic acid soda group —SO$_3$Na | 1/15,000 |
| g | vinyl chloride copolymer | 30,000 | quaternary ammonium soda group —NH$_3$Na | 1/15,000 |
| h | vinyl chloride copolymer | 30,000 | sulfo betaine group *1 | 1/15,000 |
| i | vinyl chloride copolymer | 30,000 | hydroxide group —OH | 1/15,000 |
| j | *2 | 30,000 | carboxyl group —CO$_2$H | 1/17,500 |
| k | *2 | 35,000 | sulfonic acid soda group —SO$_3$Na | 1/17,500 |
| l | *2 | 35,000 | sulfo betaine group *1 | 1/17,500 |
| m | *2 | 35,000 | hydroxide group —OH | 1/17,500 |
| n | polyester | 27,000 | carboxyl group —CO$_2$H | 1/13,500 |
| o | polyester | 27,000 | sulfonic acid soda group —SO$_3$Na | 1/13,500 |
| p | polyester | 27,000 | sulfo betaine group *1 | 1/13,500 |
| q | polyester | 27,000 | hydroxide group —OH | 1/13,500 |
| r | uretane | 40,000 | amino group —NH$_3$ | 1/20,000 |
| s | uretane | 40,000 | carboxyl group —CO$_2$H | 1/20,000 |
| t | uretane | 40,000 | acid amide group —CONH | 1/20,000 |
| u | uretane | 40,000 | sulfonic acid soda group —SO$_3$Na | 1/20,000 |
| v | uretane | 40,000 | phosphate group —PO$_3$H$_2$ | 1/20,000 |
| w | uretane | 40,000 | quaternary ammonium soda group —NH$_3$Na | 1/20,000 |
| x | uretane | 40,000 | epoxy group *3 | 1/20,000 |
| y | uretane | 40,000 | sulfo betaine group *1 | 1/20,000 |
| z | uretane | 40,000 | hydroxide group —OH | 1/20,000 |

Note:

*1 $CH_3-\overset{\oplus}{N}\begin{smallmatrix}CH_2CH_2OH\\CH_2CH_2OH\\CH_2CH_2CH_2SO_3^{\ominus}\end{smallmatrix}$

*2 polyvinyl chloride acetate copolymer

*3 —CH——CH$_2$ \ / O

Table 3 shows constituents of the magnetic paint of the embodiments of the present invention and of comparative examples.

TABLE 3

CONSTITUENTS OF MAGNETIC PAINT

| | magnetic powder | resin 1 | 2 | 3 | 4 | amount of resin A | B | C | D |
|---|---|---|---|---|---|---|---|---|---|
| embodi. 1 | A | h | k | n | r | 5 | 5 | 5 | 5 |
| embodi. 2 | A | f | l | s | — | 5 | 5 | 10 | — |
| embodi. 3 | A | j | o | y | — | 10 | 5 | 5 | — |
| embodi. 4 | A | c | p | — | — | 10 | 10 | — | — |
| embodi. 5 | A | a | t | — | — | 10 | 10 | — | — |
| embodi. 6 | A | b | u | — | — | 10 | 10 | — | — |
| embodi. 7 | A | d | w | — | — | 10 | 10 | — | — |
| embodi. 8 | A | e | x | — | — | 10 | 10 | — | — |
| embodi. 9 | A | g | s | — | — | 10 | 10 | — | — |
| embodi. 10 | A | h | n | — | — | 10 | 10 | — | — |
| embodi. 11 | A | l | u | — | — | 10 | 10 | — | — |
| embodi. 12 | A | f | p | — | — | 10 | 10 | — | — |
| embodi. 13 | A | j | y | — | — | 10 | 10 | — | — |
| embodi. 14 | A | k | o | — | — | 10 | 10 | — | — |
| embodi. 15 | A | o | — | — | — | 20 | — | — | — |
| embodi. 16 | A | y | — | — | — | 20 | — | — | — |
| embodi. 17 | C | l | p | — | — | 10 | 10 | — | — |
| compara. 1 | A | i | z | — | — | 10 | 10 | — | — |
| compara. 2 | A | m | q | — | — | 10 | 10 | — | — |
| compara. 3 | B | h | k | n | r | 5 | 5 | 5 | 5 |
| compara. 4 | B | j | o | y· | — | 10 | 5 | 5 | — |
| compara. 5 | B | f | p | — | — | 10 | 10 | — | — |
| compara. 6 | B | o | — | — | — | 20 | — | — | — |
| compara. 7 | B | m | q | — | — | 10 | 10 | — | — |

Note:
"embodi." shows embodiment. "compara." shows comparative example.

Glossiness of the magnetic paints of the embodiments 1 to 17 and the comparative examples 1 to 7 on base films during the dispersing step was measured by using a digital deformation glossimeter (type UGV-5D) of Suga Shikenki K. K. under condition of light incident angle and light reflection angle of 60 degrees. Results are shown in Table 4.

TABLLE 4

GLOSSINESS OF MAGNETIC PAINT

| | 1 hour | 5 hours | 15 hours |
|---|---|---|---|
| embodi. 1 | 40 | 80 | 148 |
| embodi. 2 | 48 | 90 | 155 |
| embodi. 3 | 44 | 91 | 145 |

TABLLE 4-continued

| GLOSSINESS OF MAGNETIC PAINT | | | |
|---|---|---|---|
| | 1 hour | 5 hours | 15 hours |
| embodi. 4 | 44 | 94 | 144 |
| embodi. 5 | 42 | 99 | 141 |
| embodi. 6 | 39 | 96 | 157 |
| embodi. 7 | 40 | 91 | 148 |
| embodi. 8 | 46 | 87 | 157 |
| embodi. 9 | 50 | 86 | 154 |
| embodi. 10 | 46 | 88 | 142 |
| embodi. 11 | 46 | 92 | 144 |
| embodi. 12 | 45 | 94 | 149 |
| embodi. 13 | 45 | 96 | 157 |
| embodi. 14 | 40 | 96 | 147 |
| embodi. 15 | 45 | 94 | 144 |
| embodi. 16 | 47 | 98 | 153 |
| embodi. 17 | 46 | 98 | 152 |
| compara. 1 | 34 | 69 | 98 |
| compara. 2 | 31 | 63 | 96 |
| compara. 3 | 47 | 79 | 145 |
| compara. 4 | 50 | 67 | 131 |
| compara. 5 | 48 | 67 | 143 |
| compara. 6 | 44 | 62 | 133 |
| compara. 7 | 39 | 64 | 115 |

Note:
"embodi." shows embodiment. "compara." shows comparative example.

As well known, glossiness corresponds to dispersion of magnetic paint and glossiness not less than 130 is acceptable.

A magnetic tape for D-3 format was obtained by painting a polyester film 10 microns thick with the magnetic paint after dispersion step, magnetically orientating magnetic particles, drying the paint and cutting it to ½ inches width. A sinusoidal wave signal of 40 MHz was recorded on the magnetic tape reproduced therefrom with using a D-3 VTR (AJ-D350, Matsushita Denki Sangyo K. K.). A reproduced output was measured and STILL durability was measured at 20° C., 10% humidity. The STILL durability was evaluated by time from a start time of still reproduction to a time at which an abnormality (noise generation) occurs on a still image displayed continuously on a monitor. The result is shown in Table 5.

TABLE 5

| REPRODUCED OUTPUT AND STILL DURABILITY | | |
|---|---|---|
| | reproduced output (dB) | still durability (hr) |
| embodi. 1 | 6.0 | 31 |
| embodi. 2 | 5.6 | 21 |
| embodi. 3 | 5.9 | 30 |
| embodi. 4 | 5.1 | 23 |
| embodi. 5 | 5.0 | 36 |
| embodi. 6 | 5.7 | 34 |
| embodi. 7 | 6.0 | 32 |
| embodi. 8 | 6.0 | 21 |
| embodi. 9 | 5.0 | 34 |
| embodi. 10 | 5.7 | 31 |
| embodi. 11 | 5.5 | 35 |
| embodi. 12 | 5.9 | 23 |
| embodi. 13 | 5.5 | 24 |
| embodi. 14 | 5.2 | 35 |
| embodi. 15 | 5.9 | 36 |
| embodi. 16 | 5.5 | 31 |
| embodi. 17 | 7.1 | 24 |
| compara. 1 | 2.3 | 1 |
| compara. 2 | 2.6 | 1 |
| compara. 3 | 0.9 | 20 |
| compara. 4 | 0.5 | 24 |
| compara. 5 | 0.9 | 25 |

TABLE 5-continued

| REPRODUCED OUTPUT AND STILL DURABILITY | | |
|---|---|---|
| | reproduced output (dB) | still durability (hr) |
| compara. 6 | 0.2 | 26 |
| compara. 7 | 0 | 2 |

Note:
"embodi." shows embodiment. "compara." shows comparative example. The reproduced output of the comparative example 7 is used as a reference of the reproduced outputs of others.

As is clear from Tables 4 and 5, glossiness and hence dispersion of the magnetic paint of the present invention during the dispersion step is high, the reproduced output of the magnetic tape of the present invention is high and the still durability of the magnetic tape of the present invention is superior. On the contrary, the comparative examples 1 and 2 which use resins containing no functional group of the present invention exhibit low glossiness and low reproduced output. Their STILL durability is considerably coarse. The comparative examples 3 to 7 using metal magnetic particles as the magnetic powder exhibit very low reproduced output.

From these facts, it is clear that the present invention which uses iron nitride material as the magnetic powder and resin containing the specific functional group or groups substantially improves the dispersion of the magnetic powder, resulting in a magnetic recording medium which is superior in view of reproduced output, still durability, that is, electromagnetic conversion characteristics, and in view of easiness of stock, stability of the magnetic paint and smoothness of surface of the magnetic layer.

What is claimed is:

1. A magnetic recording medium comprising a magnetic layer formed by painting a support film with magnetic material, said magnetic layer containing magnetic powder and a binder, mainly, wherein said magnetic powder is represented by $$Fe\ \alpha N \beta M \gamma M^* \delta$$

where $\alpha$, $\beta$, $\gamma$ and $\delta$ satisfy the following relation:

$$0.05 \leq \frac{\beta}{\alpha + \beta} \leq 0.15,\ 0 < \frac{\gamma + \delta}{\alpha + \beta} \leq 0.3$$

and M and M* each is selected from a group consisting of Be, Mg, Ca, Sr, Ba, Ra, Sc, Y, La, Ce, Pr, Nd, Sm, Eu, Gd, Tb, Dy, Ho, Er, Tm, Yb, Lu, Ti, Zr, Hf, V, Nb, Ta, Cr, Mo, W, Mn, Re, Ru, Os, Co, Rh, Ni, Pd, Cu, Zn, B, Al, Ca, In, Tl, Si, Ge, Sn, Pb, P, As, Sb, Bi, Se, Te
and has saturation magnetization $\sigma_s$ of 160–210 emu/g, coersive force Hc of 1500–2500 Oe, acicular ratio of 5–15 and major axis length of 0.05–0.15 μm, and wherein the binder contains at least one of vinyl chloride copolymer, polyvinyl chloride acetate copolymer, polyester resin and urethane resin and at least one functional group selected from a group consisting of amino group, methylol group, carboxyl group, acid amide group, isocyanate group, sulfonic acid metallic salt group, phosphate group, quaternary ammonium salt group, sulfo betaine group and epoxy group.

* * * * *